United States Patent Office 3,013,001
Patented Dec. 12, 1961

---

3,013,001
N-SUBSTITUTED PYRAZOLE COMPOUNDS AND POLYMERIZATION PRODUCTS THEREOF
John W. Lynn, Charleston, W. Va., assignor to Union Carbide Corporation, a corporation of New York
No Drawing. Filed Mar. 26, 1959, Ser. No. 802,011
10 Claims. (Cl. 260—87.7)

This invention relates to novel N-substituted pyrazole compounds as new compositions of matter, and to processes for their production.

The novel substituted pyrazole compounds of this invention can be graphically depicted by the formula

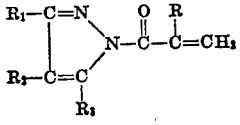

wherein R is a member selected from the group consisting of hydrogen, lower alkyl, phenyl, acyl, acyloxy, lower alkyl sulfinyloxy, cyano, nitro and halogen radicals and $R_1$, $R_2$ and $R_3$ are members selected from the group consisting of hydrogen, lower alkyl and phenyl radicals. By the term "lower alkyl" as used herein is meant an alkyl radical having from 1 to 5 carbon atoms. Illustrative examples of the novel N-substituted pyrazole compounds of this invention include N-acrylylpyrazole which can be represented by the formula

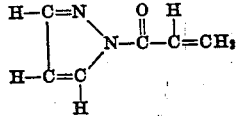

and N-methacrylylpyrazole which can be represented by the formula

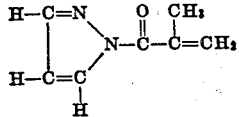

and such compounds as

N-(2-phenylacrylyl)-3,4,5-trimethylpyrazole,
N-(2-ethylacrylyl)pyrazole,
N-(2-amylacrylyl)-3-ethylpyrazole,
N-(2-methoxyacrylyl)-3-methyl-5-phenylpyrazole,
N-(2-cyanoacrylyl)-4-amylpyrazole,
N-(2-nitroacrylyl)-3,4,5-triethylpyrazole,
N-(2-chloroacrylyl)pyrazole,
N-methacrylyl-3-methyl-5-phenylpyrazole,
N-methacrylyl-3-amyl-4-ethylpyrazole and the like.

The novel N-substituted pyrazole compounds of this invention can be produced by the reaction of a pyrazole compound with an unsaturated acid chloride or anhydride.

The pyrazole compounds which can be employed as starting materials can be graphically depicted by the formula

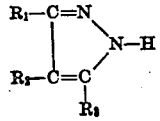

wherein $R_1$, $R_2$ and $R_3$ are as above defined. Illustrative of such starting materials is pyrazole which can be represented by the formula

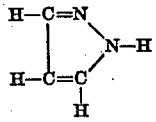

and 3,4,5-trimethylpyrazole which can be represented by the formula

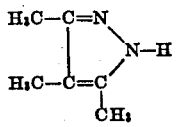

and such compounds as 3-ethylpyrazole, 3-methyl-5-phenylpyrazole, 4-amylpyrazole, 3,4,5-triethylpyrazole, 3-amyl-4-ethylpyrazole and the like.

The unsaturated acid chlorides and anhydrides which can be employed as starting materials in preparing the novel compounds of this invention can be graphically depicted by the formulae

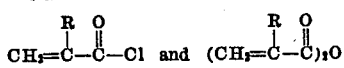

wherein R is as above defined. Illustrative of such starting materials are such compounds as acrylyl chloride,
acrylyl anhydride,
methacrylyl chloride,
methacrylyl anhydride,
2-ethylacrylyl chloride,
2,2'-diethylacrylyl anhydride,
2-amylacrylyl chloride,
2,2'-diamylacrylyl anhydride,
2-phenylacrylyl chloride,
2,2'-diphenylacrylyl anhydride,
2-methoxyacrylyl chloride,
2,2'-dimethoxyacrylyl anhydride,
2-cyanoacrylyl chloride,
2,2'-dicyanoacrylyl anhydride,
2-nitroacrylyl chloride,
2,2'-dinitroacrylyl anhydride,
2-chloroacrylyl chloride,
2,2'-dichloroacrylyl anhydride and the like.

The compounds which can be employed as starting materials in preparing the novel compounds of this invention are known materials and can be produced in accordance with procedures customarily employed for preparing such compounds.

The process of the instant invention, which comprises reacting a pyrazole compound with an unsaturated acid chloride or anhydride, can be illustrated by the following graphic equations

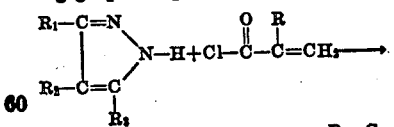

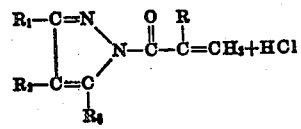

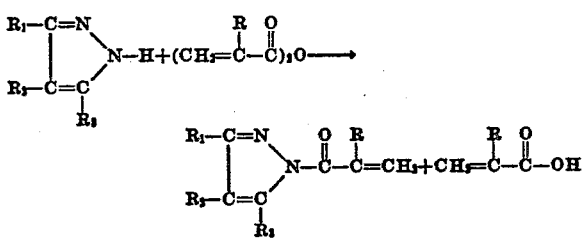

wherein R, $R_1$, $R_2$ and $R_3$ are as above defined. Thus, for example, N-acrylylpyrazole can be prepared by the reaction of pyrazole with acrylyl chloride or acrylyl anhydride, and N-methacrylylpyrazole can be prepared by the reaction of pyrazole with methacrylyl chloride or methacrylyl anhydride.

When effecting reaction according to the process of the instant invention, it is preferable to employ equimolar proportions of reactants, or a slight excess of acid chloride or anhydride, e.g. up to 10 percent excess of acid chloride or anhydride. Greater or lesser amounts of either reactant, for example amounts ranging from as little as 0.5 mole of acid chloride or anhydride to as much as 2 moles of acid chloride or anhydride per mole of pyrazole compound present, can also be employed; however, such proportions of reactants do not provide the advantages obtainable by operating within the narrower range indicated above.

When employing an acid chloride as one of the starting materials in the process of the instant invention, it is necessary to effect reaction in the presence of an acid acceptor capable of combining with the hydrogen chloride liberated by the reaction. Suitable hydrogen chloride acceptors include the oxides and hydroxides of the alkali metals, and such strongly basic non-metallic compounds as the quaternary ammonium hydroxides and tertiary amines. Specific examples of hydrogen chloride acceptors which can be employed include sodium hydroxide, potassium hydroxide, lithium hydroxide, sodium oxide, trimethylbenzylammonium hydroxide, benzyltriethylammonium hydroxide, dimethyldibenzylammonium hydroxide, trimethylamine, triethylamine, tri-n-propylamine, methyldiethylamine, dimethylethylamine, benzyldimethylamine, and benzyldiethylamine. The amount of hydrogen chloride acceptor employed should at least be sufficient to combine with the hydrogen chloride present, but excess amounts can be employed to ensure complete removal of hydrogen chloride.

When employing an acid anhydride instead of an acid chloride as one of the starting materials in the process of the instant invention, no hydrogen chloride is liberated as a result of the reaction, and the use of a hydrogen chloride acceptor is not necessary. However, in such case, it has been found that reaction is promoted by the use of a suitable catalyst, such as a strong acid or tertiary amine. Specific examples of the catalysts which can be employed include strong acids such as sulfuric acid, hydrochloric acid, nitric acid, phosphoric acid and p-toluenesulfonic acid, and tertiary amines such as trimethylamine, triethylamine, tri-n-propylamine, methyldiethylamine, dimethylethylamine, benzyldimethylamine, and benzyldiethylamine. The catalyst is usually employed in an amount of from as low as 0.01 percent by weight to as high as 10 percent by weight, preferably from 0.1 percent by weight to 0.5 percent by weight, of the combined weight of reactants employed. Greater or lesser amounts of catalyst can also be employed; however, the use of such amounts of catalyst do not provide the advantages obtainable by operating within the indicated range and is not recommended.

Reaction according to the process of the instant invention readily occurs at temperatures ranging from as low as $-10°$ C. to as high as 80° C. Preferably, reaction is effected at temperatures ranging from about 10° C. to about 30° C. Temperatures both above and below the broadly disclosed range can also be employed; however, such temperatures do not provide the advantages obtainable by operating within such temperature range.

Atmospheric pressure is usually employed in effecting reaction according to the process of the instant invention. However, pressures both above and below atmospheric pressure, for example pressures ranging from as low as 400 mm. Hg to as high as 1000 p.s.i., can also be employed whenever it is desirable to do so.

Reaction according to the process of the instant invention may be effected in an inert liquid solvent. By an inert liquid solvent is meant a liquid solvent in which the starting materials are soluble to an extent whereby they are brought into reactive contact and which itself is non-reactive under the conditions of the reaction. Suitable inert liquid solvents which can be employed for such purpose include water, hydrocarbons such as hexane, cyclohexane, heptane, benzene, toluene and the like, ethers such as dioxane, tetrahydrofuran and the like, ketones such as acetone and the like, and alcohols such as tertiary-butyl alcohol. In general, an amount of solvent ranging from 0 to about 10 times, preferably from 0 to 5 times, the weight of reactants present can be effectively employed. Greater amounts of solvent can also be employed; however, such amounts of solvent do not provide the advantages obtainable by operating with the range indicated.

The novel N-substituted pyrazole compounds of this invention find wide use in the preparation of polymeric materials. Thus, such compounds, because of the vinyl group present, can be readily homopolymerized, or copolymerized with certain vinyl-containing organic compounds, such as styrene, butadiene, vinyl acetate, methyl acrylate, methyl methacrylate, vinyl chloride, vinylidene chloride, acrylonitrile, methacrylonitrile, vinylidene cyanide, acrylamide, and the like. By the term "polymer" as used in the specification is meant a homopolymer of the N-substituted pyrazole compounds of this invention, or a copolymer of such compounds with one or more other polymerizable monomers.

Any suitable means can be employed in effecting polymerization of the novel N-substituted pyrazole compounds of this invention. For example, polymerization can be effected by means of heat, light, or a suitable vinyl polymerization catalyst, such as a peroxide or azo compound. Preferably polymerization is effected by heating in the presence of a polymerization catalyst in order to shorten the reaction time. Temperatures ranging from as low as 20° C. to as high as 100° C. are generally effective for this purpose. Among the peroxides which can be employed for such purpose may be mentioned hydrogen peroxide, barium peroxide, magnesium peroxide, diethyl peroxide, distearyl peroxide, acetyl peroxide, stearoyl peroxide and acetyl benzoyl peroxide, while specific examples of the azo compounds which can be employed include $\alpha,\alpha'$-azodiisobutyronitrile and 2,2'-dicyanoazobenzene.

The copolymers obtained by copolymerizing the novel N-substituted pyrazole compounds of this invention generally contain from as low as 1 molar percent to as high as 50 molar percent of combined pyrazole compound.

The polymeric materials produced by polymerizing the novel N-substituted pyrazole compounds of this invention are useful as coagulants for sewage sludge.

The following examples of my invention are set forth for purposes of illustration so that those skilled in the art may better understand my invention, and it should be understood that they are not to be construed as limiting my invention in any manner.

EXAMPLE I

*Preparation of N-methacrylylpyrazole*

An admixture of 28 grams of pyrazole (0.5 mole), 150 ml. of benzene, and 51 grams of triethylamine was prepared and maintained at a temperature of 10° C.

by cooling while 52.5 grams of methacrylyl chloride (0.5 mole) were added over a one hour period with continuous stirring. The voluminous precipitate (triethylamine hydrochloride) obtained by this procedure was removed by filtration, and the filtrate obtained thereby was fractionally distilled under reduced pressure. About 36 grams of N-methacrylylpyrazole, boiling at a temperature of 52° C. at 2.5 mm. Hg pressure, were collected. This represented a yield of about 53 percent of theoretical. This material had an index of refraction of 1.5330 at 30° C., and was identified by its infrared absorption spectrum and chemical analysis.

*Analysis.*—Calculated for $C_7H_8N_2O$: C, 61.65%; H, 5.88%; N, 20.58%. Found: C, 61.63%; H, 5.98%; N, 19.33%.

EXAMPLE II

*Copolymerization of N-methacrylylpyrazole with vinylidene chloride*

To a reaction vessel were charged 30 parts by weight of N-methacrylylpyrazole, 70 parts by weight of vinylidene chloride and 1 part by weight of azo-bis-isobutyronitrile. The vessel was heated with agitation for 4¾ hours in a bath maintained at a temperature of 50° C. Upon cooling, methanol was added to the mixture and the precipitate obtained thereby was washed three times with methanol and dried by heating. About 16 percent of the theoretical yield of copolymer was obtained in this manner. The copolymer was composed of about 58.4 percent by weight of N-methacrylylpyrazole and 41.6 percent by weight of vinylidene chloride, and had a reduced viscosity of 0.07 in cyclohexane.

Reduced viscosity ($I_R$) is a measure of the molecular weight of a polymer, and may be defined by the equation $$I_R = \frac{\frac{\Delta N}{N_0}}{C}$$

wherein $\Delta N$ is the difference in seconds between the flow-time of a solution of polymer through a capillary viscometer and the flow-time of the solvent, $N_0$ represents the flow-time of the solvent, and C is the concentration of polymer in said solution in grams per 100 ml. of solution. Measurements were made at 30° C. using cyclohexane as solvent, and a solution of 0.2 gram of polymer per 100 ml. of solution. The polymers of this invention can be liquids or solids having a reduced viscosity of at least about 0.01.

The copolymer produced by the above procedure is useful as a film for packaging purposes.

Unless otherwise specified, all parts and percentages, as used throughout this specification, are by weight.

What is claimed is:

1. The novel N-substituted pyrazole compounds represented by the general formula

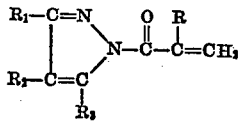

wherein R is a member selected from the group consisting of hydrogen and methyl radicals, and $R_1$, $R_2$ and $R_3$ are hydrogen radicals.

2. N-acrylylpyrazole.
3. N-methacrylylpyrazole.
4. A process for producing N-substituted pyrazole compounds represented by the general formula

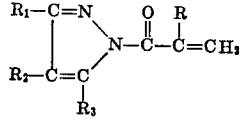

wherein R is a member selected from the group consisting of hydrogen and methyl radicals, and $R_1$, $R_2$ and $R_3$ are hydrogen radicals, which comprises reacting a pyrazole compound represented by the general formula

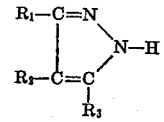

wherein $R_1$, $R_2$ and $R_3$ are as above defined, with a member selected from the group consisting of unsaturated acid chlorides represented by the general formula

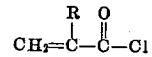

and unsaturated acid anhydrides represented by the general formula

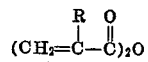

wherein R is as above defined, in the presence of a hydrogen chloride acceptor when employing an acid chloride, and recovering said N-substituted pyrazole compounds.

5. A process for producing N-methacrylylpyrazole which comprises reacting pyrazole with methacrylyl chloride in the presence of an inert liquid solvent, and a hydrogen chloride acceptor, said hydrogen chloride acceptor being present in an amount sufficient to combine with the hydrogen chloride liberated by the reaction, and recovering said N-methacrylylpyrazole.

6. A process for producing N-methacrylylpyrazole which comprises reacting pyrazole with methacrylyl chloride in the presence of an inert liquid solvent, and a tertiary amine, said tertiary amine being present in an amount sufficient to combine with the hydrogen chloride liberated by the reaction, and recovering said N-methacrylylpyrazole.

7. A homopolymer of N-methacrylylpyrazole.
8. A homopolymer of N-acrylylpyrazole.
9. A copolymer of N-methacrylylpyrazole and vinylidene chloride.
10. A copolymer of N-acrylylpyrazole and vinylidene chloride.

References Cited in the file of this patent

UNITED STATES PATENTS 2,850,485   D'Alelio _____ Sept. 2, 1958

FOREIGN PATENTS 730,449   Great Britain _____ May 25, 1955